July 20, 1948.　　　　W. L. FITCH　　　　2,445,711
MECHANICAL MOVEMENT
Filed June 17, 1946
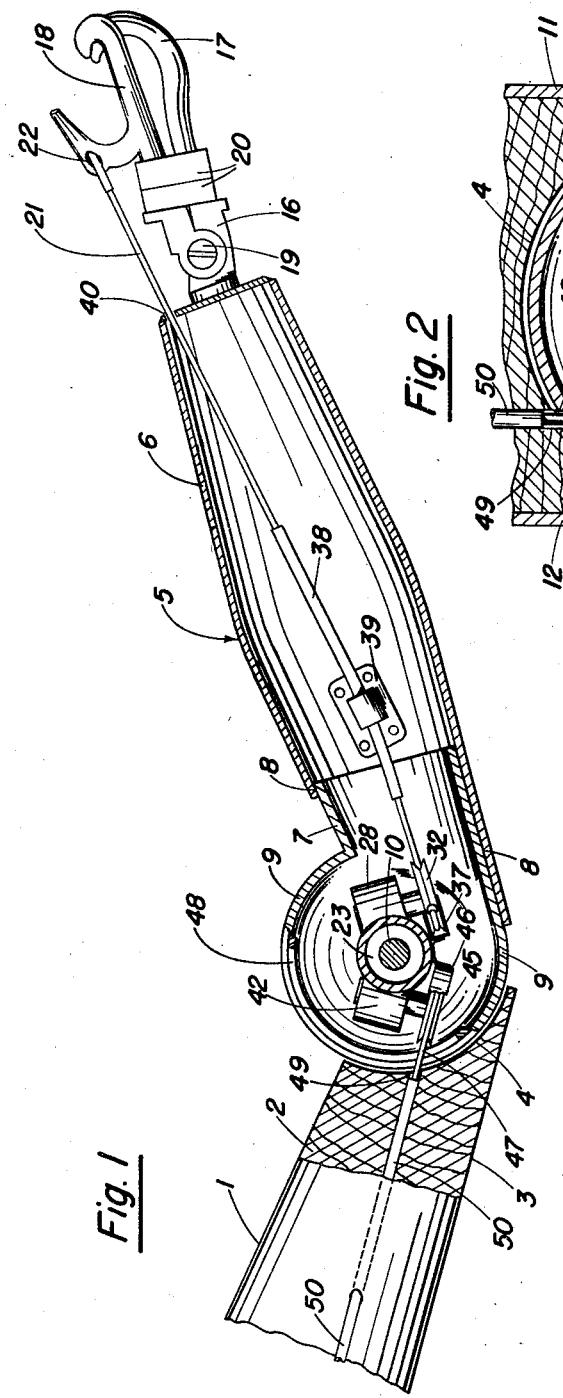
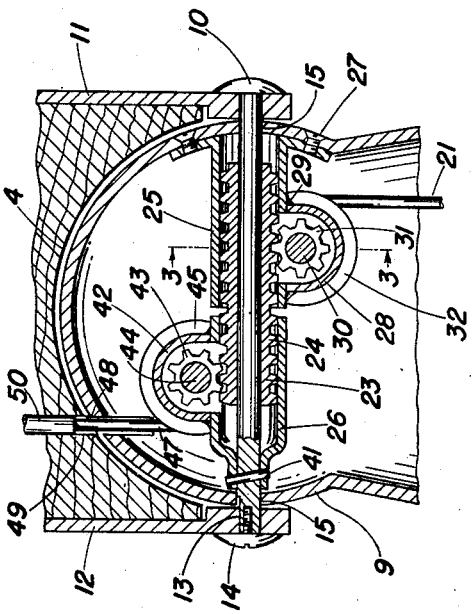
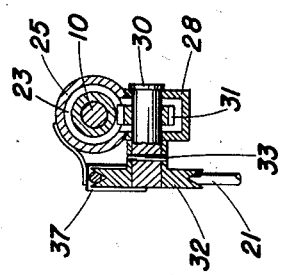
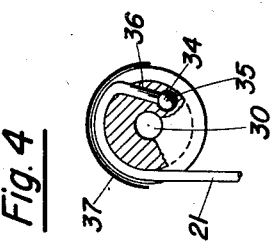
INVENTOR.
WILLIAM L. FITCH
BY
　　M. A. Hayes
ATTORNEY Patented July 20, 1948

2,445,711

UNITED STATES PATENT OFFICE 2,445,711

MECHANICAL MOVEMENT

William L. Fitch, Santa Cruz, Calif., assignor to Fitch and Sons, Inc., a corporation of California Application June 17, 1946, Serial No. 677,269

4 Claims. (Cl. 3—12)

This invention relates to a mechanical movement, and more particularly to a mechanical movement for transmitting motion through the elbow joint of an artificial arm to the hand or fingers thereof.

Prior art methods of transmitting motion from a shoulder harness to the hand, fingers, or hook of an artificial arm usually involved a stranded steel flexible cable connected at one end to the shoulder harness, passing through the sheath and guides on the external surface of the upper arm and the forearm, and connected at its other end to the extremity of the limb. Shrugging of the shoulders caused the harness to exert a pull on the cable thus operating the fingers or hook against the action of a resilient tension element such as a spring or rubber band. The mechanical action of the system was satisfactory, but the friction between the sheath and guides and the shirt sleeve of the wearer, particularly on the forearm, soon caused the sleeve to wear out. Also the friction between the cuff of the sleeve and the cable occasioned by the operating motion of the cable soon caused wear on the cuff. Furthermore, the sheath and guides caused an unnatural bulge in the contour of the sleeve.

Objects of the present invention, therefore, are to provide a mechanical movement or linkage for transmitting motion from a shoulder harness to the extremity of an artificial limb which will not wear the sleeve of the amputee; to provide a mechanical movement of the type described which will be almost entirely beneath the surface of the arm and substantially enclosed within a hollow elbow joint and forearm; and to provide a mechanical movement of the type described which will be easy to construct and of simple and durable design.

In accomplishing these and other objects of the present invention, I have provided improved details of structure, the preferred form of which is illustrated in the accompanying drawings, wherein:

Fig. 1 is a longitudinal cross-sectional view on an anterior-posterior plane of a partially flexed prosthetic arm for an above-the-elbow amputation embodying the features of the present invention;

Fig. 2 is a cross-sectional view of the elbow of the arm of Fig. 1 in extended position taken along a medial-lateral mid-plane;

Fig. 3 is a cross-sectional view taken along the line 3—3 of Fig. 2; and

Fig. 4 is a partial cross-section of the pulley wheel of Fig. 3 taken on a plane bisecting the wheel normal to its axis.

Referring more particularly to the drawing, numeral 1 indicates generally the upper arm segment of a prosthesis having a lower or elbow portion 2 made of wood, aluminum, or other suitable material and a covering 3 of leather or the like extended toward the shoulder to form a conventional bucket for receiving the stump of the amputated arm. The distal end of the upper arm is hollowed out as at 4, to form the generally spherical socket of a ball and socket elbow joint. A hollow forearm, generally indicated at 5, includes a distal segment 6 made of metal, plastic, laminated fabric or the like and is provided with an elbow segment 7 joined to the distal segment as at 8, by screws or other means not shown. The elbow segment has a generally spherical portion 9 forming the ball of the ball and socket joint. The ball 9 is pivoted to the socket member by means such as a cylindrical pin 10 passing through openings in strips of metal 11 and 12 fastened to opposite sides of the upper arm member 2. The pin is non-rotatably keyed as at 13 to the strip 12 by means such as corresponding flats formed on the end of pin 10 and in the opening in strip 12. The pin 10 is prevented from axial displacement by the retaining screw 14. The ball 9 and forearm turn freely on the pin by virtue of the cylindrical openings 15 in the wall of the ball.

As the distal end of the forearm a limb extremity such as a hand, fingers, or hook is attached. In the embodiment illustrated this extremity is illustrated as a known type of hook 16 having a relatively fixed finger 17 and a movable finger 18 pivoted to the fixed finger at 19. The fingers are held in closed position by one or more rubber bands 20. The fingers are opened in a known manner by pulling on a cable 21 fixed as at 22 to a branch of the finger 18 offset from the pivot 19. The novel mechanism for transmitting motion from a shoulder harness to the cable 21 will now be described.

Slidably and rotatably mounted on the pin 10 is a cylindrical rack 23 having a plurality of annular rack teeth 24. Closely surrounding the rack 23 are a pair of sleeves 25 and 26. The sleeve 25 is fixed relative to the forearm 5 by virture of being fastened, as by screws 27, to the ball 9. The sleeve 25 is provided with a bearing projection 28, brazed or welded thereto as at 29. The projection 28 serves as a bearing support for a shaft 30 having a pinion 31 fixed thereon, in meshing engagement with the rack 23. The projection 28 also serves as a housing for the pinion 31. A grooved wheel 32 is also fixed to the shaft 30 as by means of a pin 33. The cable 21 has one of its ends connected to the wheel 32 by means of a bead 34, Fig. 4, fixed thereto and retained in an opening 35 communicating with the groove of the wheel through a bore 36. The cable 21 is prevented from accidental displacement off the grooved wheel by a circumferentially extending guard 37, fixed to or formed on the sleeve 25. The cable 21 passes off the wheel through guide means such as a cable sheath 38 and a cable sheath anchor 39 fixed to the inside of the forearm 5 and thence through an opening 40 at the distal end of the forearm to terminate, as aforedescribed, at 22.

The sleeve 26, similar to sleeve 25, is fixed relative to the upper arm member 1 by virtue of the fact that it is fixed, as by a pin 41, to the pivot pin 10 which, in turn is fixed relative to the upper arm member. A bearing projection 42, pinion 43, pinion shaft 44, grooved wheel 45 and cable guard 46 are provided for the sleeve 26 similar to those on sleeve 25. A cable 47 is fixed to the wheel 45 and extends through a circumferential slot 48 in the hollow ball 9, thence through a bore 49 directed generally supra-laterally in the portion 2 of the upper arm. The cable is surrounded in the bore by a flexible sheath 50. The sheath and cable emerge superficially on the proximal portion of the upper arm and there the end, not shown, of cable is fastened to the shoulder harness in a known manner.

Operation

In using the prosthesis of the present invention the shoulders are shugged causing a tension to be exerted on the cable 47. This causes the wheel 45 to rotate turning the shaft 44 and pinion 43 clockwise as seen in Fig. 2. This causes the rack 23 to move to the left in Fig. 2 rotating the pinion 31, shaft 30, and wheel 32 counter-clockwise in Fig. 2. Counter-clockwise motion of wheel 32 applies tension to the cable 21 which pulls the finger 18 to open the hook against the force of the rubber bands 20. Releasing the shoulder harness allows the bands 20 to close the hook, reversing the movement of all the parts.

If the forearm is flexed or extended no disturbance of the finger operating mechanism occurs since the teeth of the pinions 31 and 43 are free to ride around the annular grooves between the teeth of the rack 23.

While I have shown but one embodiment of my invention, it is apparent that the device is susceptible to modification without departing from the spirit of the invention. I do not wish, therefore, to be limited by the disclosures set forth, but only by the scope of the appended claims.

I claim:

1. In an artificial arm having a shoulder harness, a hollow ball and socket elbow joint, and a finger hook, a cylindrical rack disposed within said hollow ball with its axis coincident with the elbow axis and slidable along its axis, a sleeve on said rack fixed to rotate with the socket member of said joint and having a transversely extending bearing projection, a pinion meshing with said rack and journalled for rotation in said projection, a grooved wheel fixed to rotate with said pinion, a flexible tension element passing through an opening in the wall of said ball and lying around said wheel to coact therewith at the periphery thereof, a second sleeve fixed to rotate with said ball and having a second transversely extending bearing projection, a second pinion meshing with said rack and journalled for rotation in said second projection, a second grooved wheel fixed to rotate with said second pinion and a second flexible tension element lying around said second wheel and coacting therewith at the periphery thereof, one of said flexible elements being connected to said harness and the other of said flexible elements being connected to said finger hook.

2. In an artificial arm having a shoulder harness, a hollow ball and socket elbow joint, and a finger hook, a cylindrical rack disposed within said ball with its axis coincident with the elbow axis and slidable along its axis, a bearing support fixed relative to said ball, a pinion journalled in said bearing support and meshing with said rack, a flexible tension element in torque-reacting relationship to said pinion, a second bearing support fixed relative to said socket, a second pinion journalled in said second support and meshing with said rack and a second flexible tension element in torque-reacting relationship with said second pinion, one of said elements being connected to said shoulder harness and the other of said elements being connected to said finger hook.

3. A mechanical movement for transmitting motion through a joint pivotally connecting two members comprising a cylindrical rack mounted for slidable movement along its axis and having its axis coincident with the pivot axis of the joint, a bearing support fixed relative to one of said members, a pinion journalled in said support and meshing with said rack, a flexible tension element in torque-reacting relation with said pinion, a second bearing support fixed relative to the other of said members, a second pinion journalled in said second support and meshing with said rack, and a second flexible tension element in torque-reacting relation with said second pinion.

4. In an artificial arm having an upper arm, a forearm articulated to said upper arm at an elbow joint, and a finger member, mechanism for transmitting actuating motion to said finger member through said elbow joint independently of articulatory motion of said joint comprising a cylindrical rack mounted for sliding motion along its axis and having its axis coincident with the axis of said elbow joint, a bearing support fixed relative to said upper arm, a pinion journalled in said support in meshing engagement with said rack, a flexible tension element for exerting a torque on said pinion, a second bearing support fixed relative to said forearm, a second pinion journalled in said second support in meshing engagement with said rack, and a second flexible tension element for transmitting actuating motion of said second pinion to said finger member.

WILLIAM L. FITCH.

REFERENCES CITED

The following references are of record in the file of this patent:

UNITED STATES PATENTS

| Number | Name | Date |
|---|---|---|
| 2,026,459 | Caretta | Dec. 31, 1935 |
| 2,273,602 | Trant | Feb. 17, 1942 |